United States Patent
Ronnlund et al.

(10) Patent No.: US 7,410,415 B2
(45) Date of Patent: Aug. 12, 2008

(54) SYSTEM FOR VENTILATING A VEHICLE CAB AND CLOSET, FURTHER INCLUDING CLOSET DRYING MEANS

(75) Inventors: Matts Ronnlund, Gothenburg (SE); David Hellstedt, Lyons (FR)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/161,801

(22) Filed: Aug. 17, 2005

(65) Prior Publication Data
US 2006/0113061 A1 Jun. 1, 2006

Related U.S. Application Data

(63) Continuation of application No. PCT/SE2004/000212, filed on Feb. 17, 2004, now abandoned.

(30) Foreign Application Priority Data
Feb. 17, 2003 (SE) ................................. 0300433

(51) Int. Cl.
*B60H 3/00* (2006.01)
*B60H 1/02* (2006.01)
*B62D 33/06* (2006.01)

(52) U.S. Cl. .................. 454/162; 237/12.3 B; 296/37.6

(58) Field of Classification Search ................ 454/163, 454/253, 139, 143, 162; 237/34, 12.3 B; 296/37.6
See application file for complete search history.

(56) References Cited

U.S. PATENT DOCUMENTS

| 296,319 | A | | 4/1884 | Duwelius | |
|---|---|---|---|---|---|
| 3,403,613 | A | * | 10/1968 | Huber | 454/333 |
| 3,638,551 | A | * | 2/1972 | Morchen et al. | 454/146 |
| 4,121,684 | A | * | 10/1978 | Stephens et al. | 180/89.14 |
| D296,319 | S | | 6/1988 | Wetter | |
| 5,230,604 | A | * | 7/1993 | Glaser et al. | 415/60 |
| 5,333,678 | A | * | 8/1994 | Mellum et al. | 165/42 |
| 5,370,576 | A | * | 12/1994 | Krofchalk | 454/143 |
| 5,732,764 | A | * | 3/1998 | Douglas et al. | 165/41 |
| 5,755,040 | A | * | 5/1998 | Ou | 34/202 |
| 5,779,537 | A | * | 7/1998 | Alden | 454/239 |
| 5,871,041 | A | * | 2/1999 | Rafalovich et al. | 165/10 |

(Continued)

FOREIGN PATENT DOCUMENTS

DE 86 00 248.1 4/1986

(Continued)

OTHER PUBLICATIONS

International Search Report dated May 13, 2004.

*Primary Examiner*—Steven B. McAllister
*Assistant Examiner*—Patrick F. O'Reilly, III
(74) *Attorney, Agent, or Firm*—Novak Druce + Quigg, LLP

(57) ABSTRACT

System for ventilating a vehicle cab (1) and a closet (3) for the drying, airing and storage of work clothing. The system is constituted by a fan in the closet (3) and the fan (9) extracts air from the cab (1) through the closet (3). Excess heat from the coolant circuit of the drive engine is utilized as a heat source in the drying of work clothing. Also, the invention can be advantageously used when the cab is occupied overnight.

16 Claims, 5 Drawing Sheets

U.S. PATENT DOCUMENTS

| | | |
|---|---|---|
| 6,018,885 A * | 2/2000 | Hill ............................. 34/202 |
| 6,361,429 B1 | 3/2002 | Pawlak, III et al. |
| 6,422,626 B1 * | 7/2002 | Beigel ....................... 296/24.4 |
| 6,851,470 B2 * | 2/2005 | Laukhuf ..................... 165/202 |

FOREIGN PATENT DOCUMENTS

| | | |
|---|---|---|
| DE | 44 23 903 | 1/1996 |
| EP | 309 692 B1 | 4/1989 |
| EP | 1 155 886 A1 | 11/2001 |
| JP | 55110846 A * | 8/1980 |
| JP | 01182456 A * | 7/1989 |
| WO | 2004071854 A1 | 8/2004 |

* cited by examiner

SYSTEM FOR VENTILATING A VEHICLE CAB AND CLOSET, FURTHER INCLUDING CLOSET DRYING MEANS

CROSS-REFERENCE TO RELATED APPLICATIONS

The present application is a continuation patent application of International Application No. PCT/SE2004/000212 filed 17 Feb. 2004 which was published in English pursuant to Article 21(2) of the Patent Cooperation Treaty, and which claims priority to Swedish Application No. 0300433-0 filed 17 Feb. 2003. Said applications are expressly incorporated herein by reference in their entireties.

TECHNICAL FIELD

The present invention relates to a ventilated vehicle cab having a storage, drying and airing system. More particularly, the invention is intended to improve the facilities for ventilating the cab for overnight occupancy and for the airing and drying of work clothing.

BACKGROUND OF THE INVENTION

Adjacent to vehicle cabs equipped with facilities for overnight occupancy, some problems arise which this invention is designed to solve. In Europe, the cubage (volume) of contemporary sleeping cabs for trucks is usually as little as four to seven cubic meters. When one or two persons spend a number of hours in the cab overnight, the carbon dioxide content can become very high and can even exceed set limit values for the carbon dioxide content. The exhaled air has the effect, moreover, of raising the air humidity in the cab. This contributes to condensation problems and, as the cab is made of metal, the air humidity should be kept at a low level. In addition, the truck driver and/or co-passengers are occasionally forced to work in work clothing which has to be stored in the cab. This work clothing can become contaminated, damp and extremely foul-smelling. There is therefore a need to ventilate odor and dangerous gases which may be present after work has been conducted in work clothing or protective clothing in the course of professional traffic. Finally, there is a need to dry and store clothes and work clothing.

In order to overcome problems with odor and dangerous gases, contemporary trucks are usually ventilated by the introduction of fresh air by the circulation fan of the air conditioning unit. The drawback with this is a high energy consumption, which can mean that the truck batteries are drained after the fan has been running for several hours during, for example, overnight occupancy. The consequence might be that, the next day, the truck cannot be started.

A previously known device relating to a trailer having a drying closet is illustrated in patent document DE 44 23 903. This drying closet is used for drying clothes. The clothes are dried with heat by gas-heating and the air is conducted from the drying closet into the trailer.

A previously known device relating to a clothes closet for a vehicle cab is illustrated in patent document EP 309 692. This device comprises a clothes closet having a hinged cover on the top side of the clothes closet. The clothes closet is disposed closely adjacent to the sleeping space in the vehicle cab.

Another device for storing clothes, for example, in a vehicle cab is previously known from patent document U.S. D. No. 296 319, which shows a storage unit consisting of a plurality of shelves and cabinets.

A drawback with ordinary storage cabinets is that it is difficult to store and dry wet clothes or other wet articles, such as, for example, towels, therein. Clothes which are stored wet develop an unpleasant odor or, in the worst case, mold, which leads, in turn, to a poor interior environment in the vehicle. Furthermore, ordinary storage cabinets do not offer a facility for active ventilation, as is desirable when the night is spent in a truck cab.

SUMMARY OF THE INVENTION

The abovementioned problems are overcome by installing a system for the ventilation of air, which, according to the invention described below, is conducted from the cab out into the open air.

A principal object of the present invention is to provide in a vehicle cab a system which allows good ventilation for overnight occupancy, storage of and the facility to dry and ventilate work clothing.

The invention is constituted by a cab comprising (including, but not necessarily limited to) a device for ventilating the vehicle cab and a closet for storage, drying and airing of work clothing. The invention is characterized in that the ventilation device comprises a fan for propelling an air current and an air intake and air extractor situated in the closet for conducting the air from the cab through the closet and then out of the closet and hence also out of the cab. The closet is thus equipped with an air intake and an air extractor, and the fan is placed in the closet adjacent to the air extractor. Air is therefore extracted from the cab via the closet, creating a vacuum in the cab, which vacuum draws in fresh air through narrow openings and the like.

Good ventilation is therefore achieved by the air being drawn from the cab to the closet, after which the air is extracted from the closet with the aid of the fan. Foul-smelling air and dangerous gases from work clothing are therefore extracted from the closet.

The closet further comprises a device for heating the interior of the closet and this device is preferably placed in the lower part of the closet and adjacent to the air intake of the closet. According to the invention, the heating device is coupled to the coolant circuit so as thereby to utilize excess heat from the engine. The heat generated when the drive engine in a vehicle is switched on is continuously evacuated, according to the prior art, to prevent overheating of the engine. Some of this heat is used to heat the cab and is conducted from the engine via a coolant circuit to the cab and, in the present invention, also to the closet for use in the closet as a heat source.

The invention gives rise to a number of advantages. First and foremost, it can be recorded that, as a result of the invention, good ventilation is obtained in the cab for overnight occupancy. The device for achieving good ventilation comprises a fan which is energy efficient and, if possible, also silent. A fan of this type is well suited to being switched on for a number of hours, such as during overnight occupancy, without draining the truck batteries. The energy efficiency of the fan derives from the fact that only a small, but relatively constant flow of air is needed over a period of a number of hours. A reason for keeping the air flow relatively small is that the air in the cab is then more easily able to preserve a comfortable and fairly constant temperature.

With a system according to the invention, moreover, a closet is obtained in which the driver can easily store, dry and air out work clothing, and in which excess heat from the coolant circuit of the drive engine is used as a heat source when the closet functions as a drying closet. This minimizes the strain on the battery and allows clothes to be dried while the vehicle is stationary, subject to the coolant being warm.

In order for the coolant circuit to be able to provide the heat source of the closet with heat even when the engine is switched off, a so-called parking heater can be coupled to the coolant circuit in parallel with the drive engine of the vehicle. This is advantageously used, for example, for drying clothes in the case of overnight occupancy.

The placement of the fan next to the extractor of the closet offers the advantage that a vacuum is formed in the closet, which results in the door of the closet being forced firmly against the closet walls and thus is easily managed to be kept shut.

The ventilation functions also in those cases where the closet is not used as a drying closet and where the door of the closet, for some reason, is kept open, since the fan extracts air from the cab. If the fan were instead to have been placed next to the intake to the closet and if, moreover, the closet door were to be kept open, the air current could be conducted into the cab and, should harmful gases be present in clothes placed in the closet, these dangerous gases could therefore be transmitted via the air into the cab.

Other advantages of the present invention relate to the fact that, in the event of attempted robbery, there is also a risk of dangerous gases being sprayed into the cab with a view to making the occupants drowsy. The present system for constant ventilation of the cab means that the content of any gas which has been sprayed in is rapidly reduced.

A further advantage of conducting the air from the cab is that moisture, too, is removed from the cab. If the air from the drying closet were to be allowed to circulate in the cab, condensation problems might arise. The majority of cabs are made of metal and, in order to prevent condensation problems, the air humidity should be kept at a low level.

As previously mentioned, one advantage of the invention is to reduce the carbon dioxide content during overnight occupancy by extracting from the cab air which is rich in carbon dioxide. The conventional method of blowing air into the cab via the fan in the air-conditioning unit is not sufficiently efficient to rapidly and effectively reduce the carbon dioxide content or the content of harmful gases.

BRIEF DESCRIPTION OF THE DRAWINGS

The invention will be explained in greater detail below with reference to the accompanying drawings, in which.

DETAILED DESCRIPTION

Figure 1:
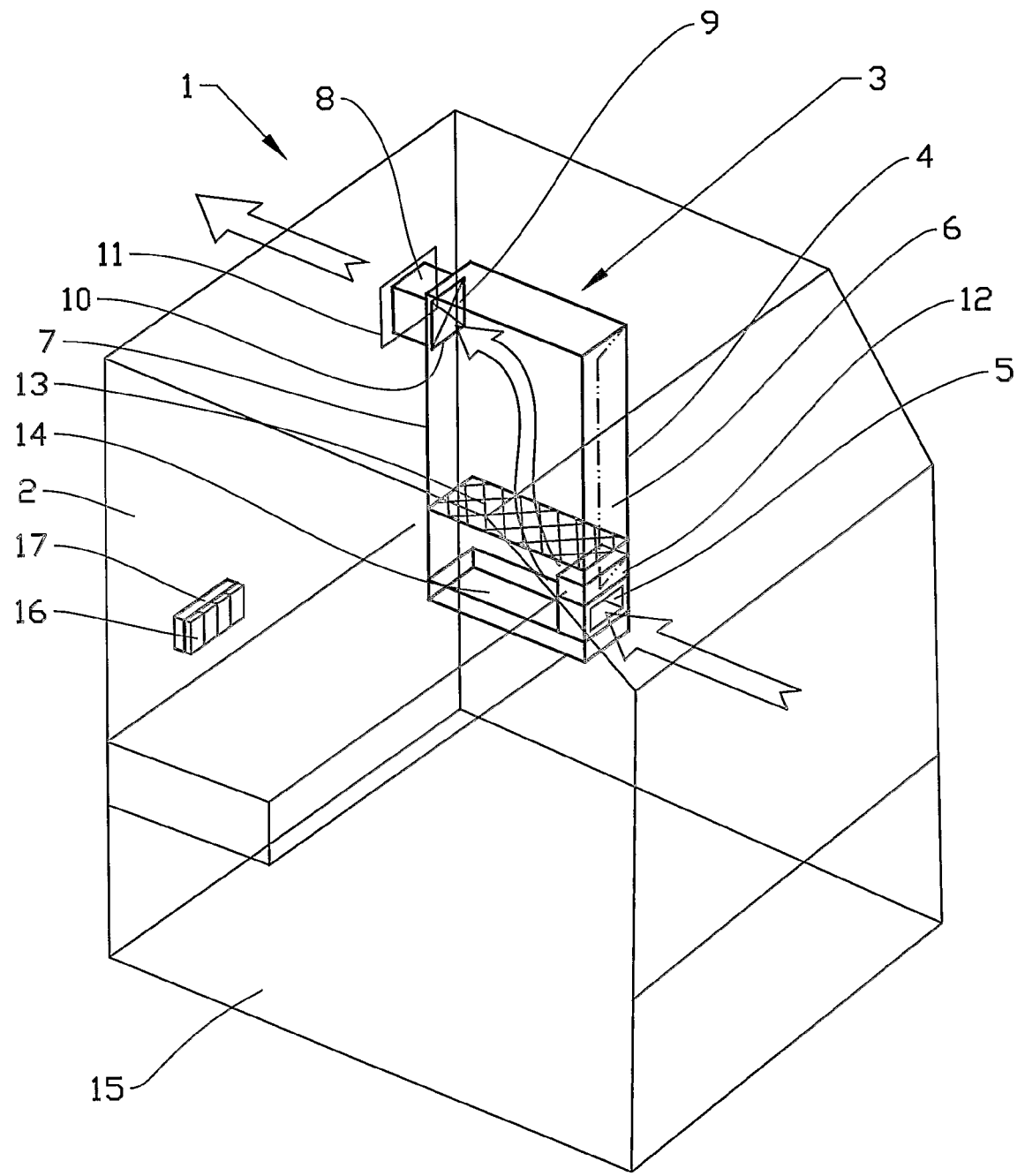
FIG. 1 is a perspective view showing, in diagrammatic representation, how a preferred embodiment of the present invention can be disposed in the cab of a truck.

In FIG. 1, a diagrammatic representation is shown of a perspective view of the cab 1 of a truck in which a preferred embodiment of the invention is utilized. The cab 1 contains, adjacent to the rear wall 2 of the cab, a closet 3 according to a preferred embodiment of the invention.

In the front wall 4 of the closet, in its lower part, there is an air-intake opening 5. Above this opening there is disposed a door 6, which door 6 essentially covers the remaining part of the front wall 4 of the closet.

In the rear wall 7 of the closet, in the upper part of the closet, there is an air extractor 8, which is constituted by a ventilation device comprising a fan 9 mounted adjacent to an opening 10 in the rear wall 7 of the closet, which opening 10 is connected to an opening 11 in the rear wall 2 of the vehicle cab. The air extractor 8 is provided with a nonreturn valve (not shown) for preventing cold air from being sucked in from outside when the fan 9 is shut off.

In the lower part of the closet is mounted a heating element 12, which is connected by a shut-off valve 20 to the coolant circuit 19 of the drive engine. Above and adjacent to the heating element 12 is a drying grate 13 to allow drying, for example, of shoes, gloves and other small objects.

In the bottom of the closet 3 there is a container 14 for water collection, which is connected to a drain (not shown) in the floor 15 of the cab.

The drying function of the closet 3 is switched off and on by the use of a switch 16 on a control panel 17 already present in the cab 1.

When the closet 3 is switched on and functioning as a drying closet, air is sucked out from the cab into the closet through the air intake 5, whereupon the air flows up through the heating element for extraction through the air extractor 8.

Figure 2:
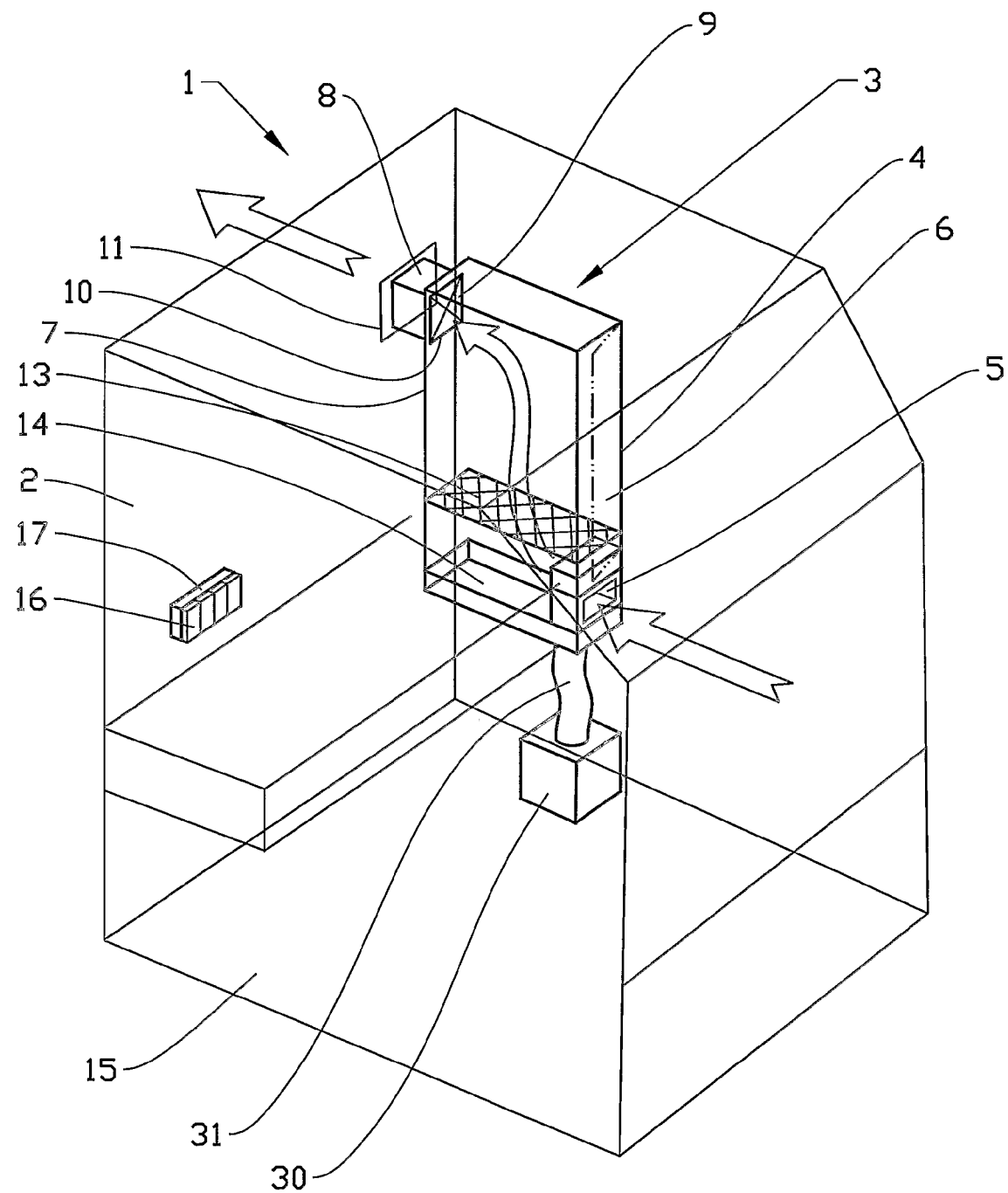
FIG. 2 is a perspective view showing, in diagrammatic representation, how an alternative embodiment of the present invention can be disposed in the cab of a truck.

In FIG. 2, a diagrammatic representation in perspective view is shown of the cab 1 of a truck in which an alternative embodiment of the invention is utilized, in which a heating device 30 is disposed adjacent to the closet 3. The heating device 30 is connected to the closet through an opening 31 in the latter.

Figure 3:
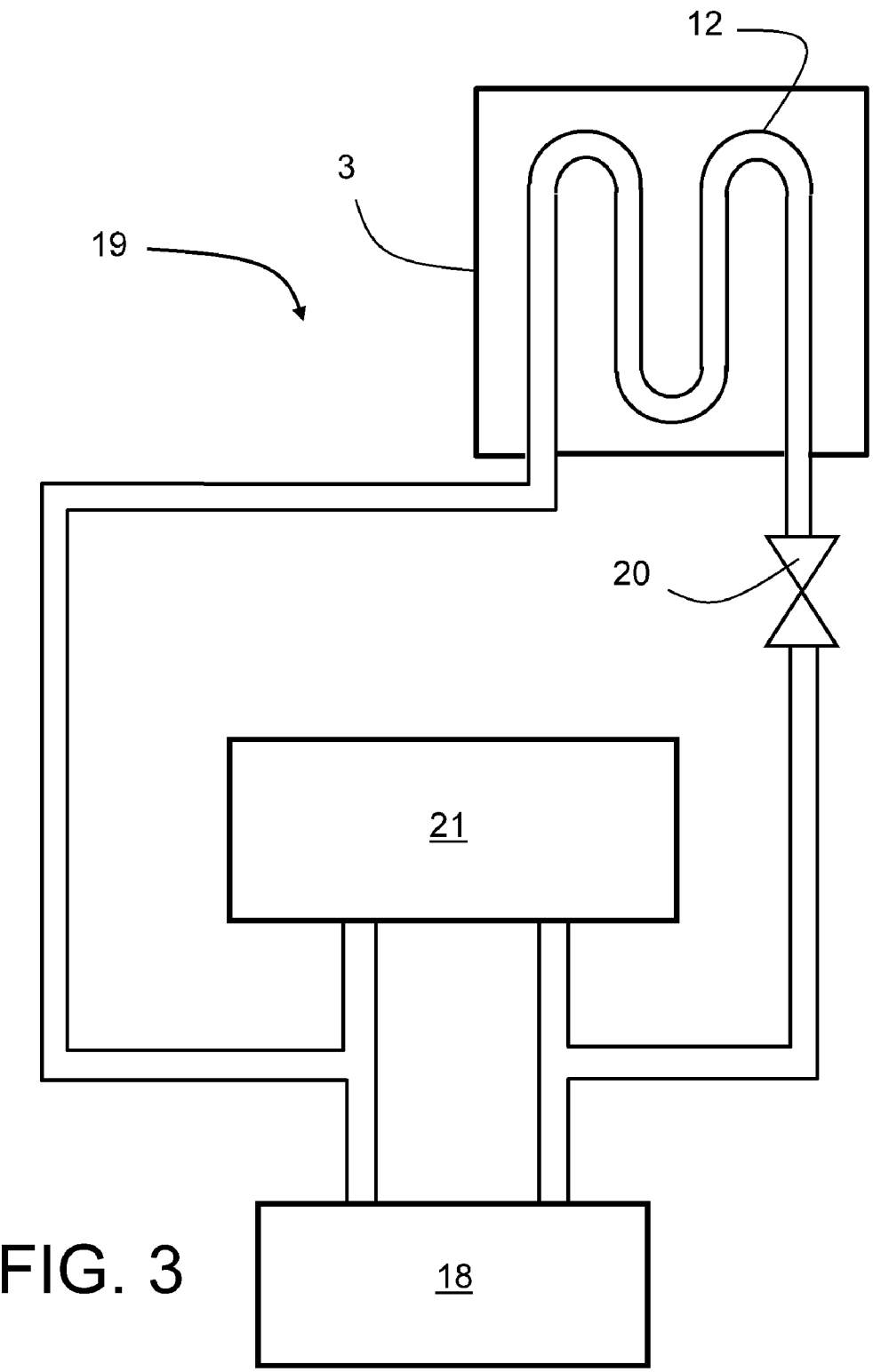
FIG. 3 is a basic diagram of an arrangement in which a preferred embodiment of the present invention can be implemented (utilized)

FIG. 3 shows a basic diagram of an arrangement in which a preferred embodiment of the present invention can be utilized. It can be seen from the figure that the heating element 12 of the closet 3 is connected to the coolant circuit 19 of the drive engine 18 of the vehicle. The figure also illustrates that the connection from the coolant circuit 19 to the heating element 12 of the closet is provided with a shut-off valve 20, which is opened and closed, respectively, when the heating function of the closet 3 is switched on or off. Also connected to the coolant circuit 19 is a heat exchanger 21 for heating of the vehicle cab 1.

Figure 4:
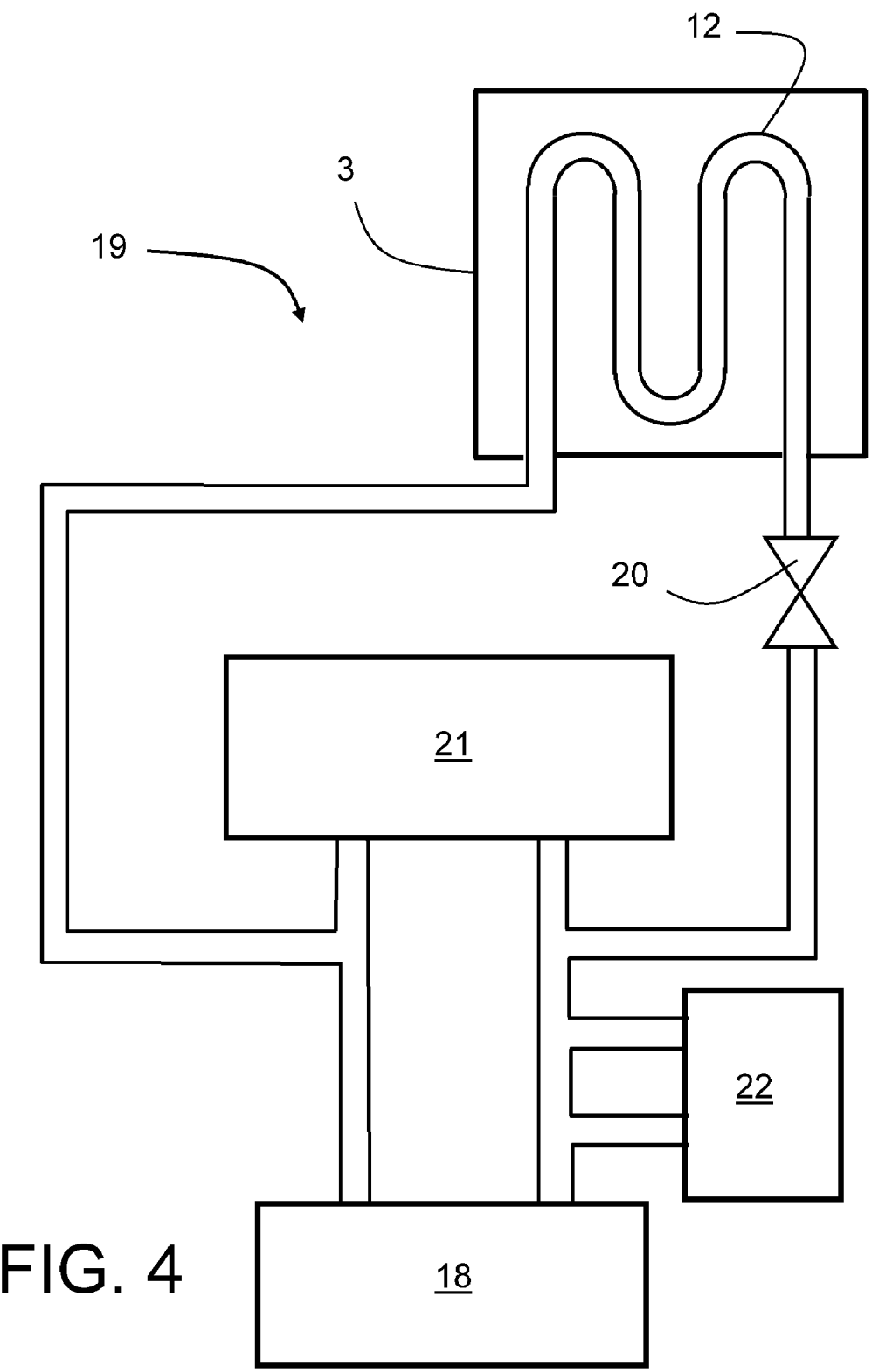
FIG. 4 is a basic diagram of an arrangement in which an alternative embodiment of the present invention can be utilized.

In FIG. 4 a basic diagram is shown of an arrangement in which an alternative embodiment of the present invention can be utilized in which a so-called parking heater 22 is coupled in parallel with the drive engine 18 of the vehicle to the coolant circuit 19. The parking heater 22 is connected once the drive engine 18 of the vehicle is shut off, for example when the vehicle is parked for the night.

Figure 5:
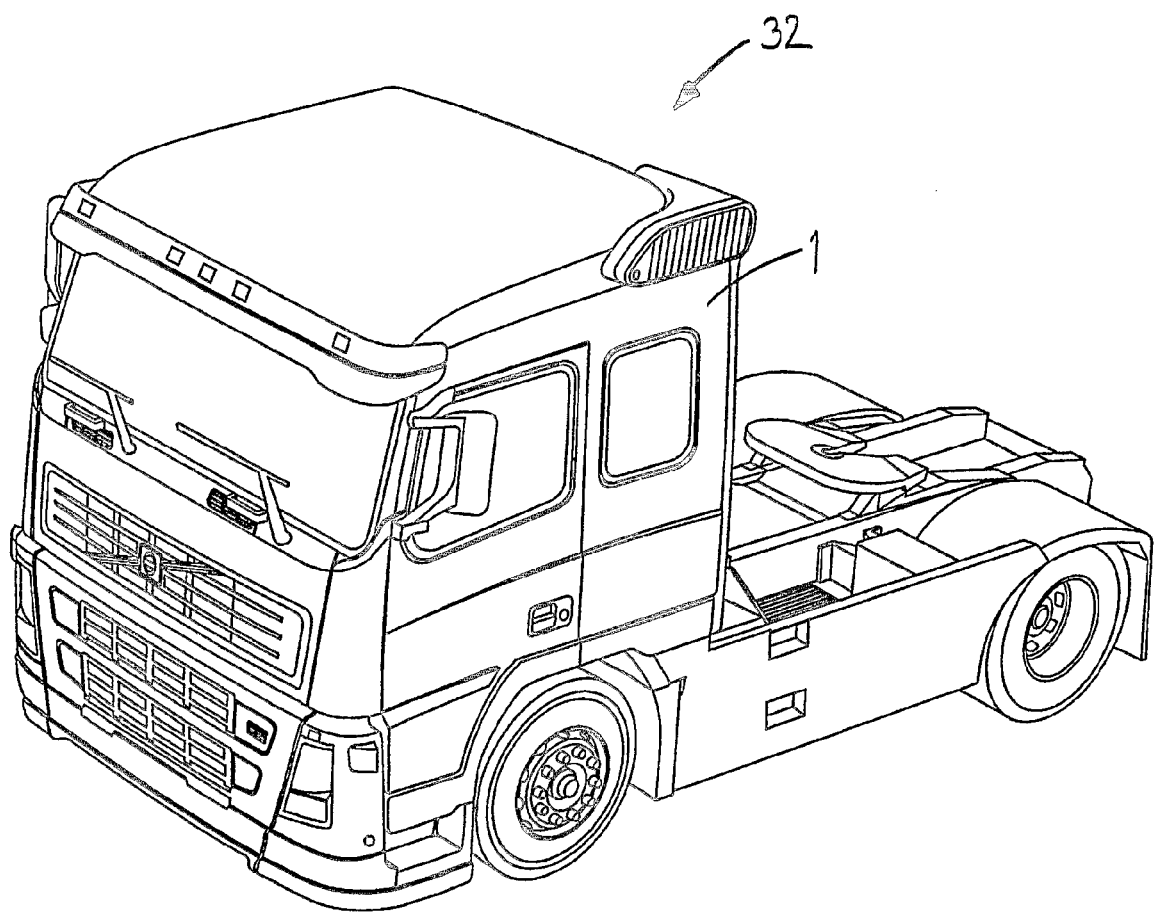
FIG. 5 is a perspective view of a truck in which the present invention can be utilized.

FIG. 5 shows a perspective view of a truck 32 comprising a cab 1 in which a system according to the present invention can be utilized.

It should be appreciated that the invention is not limited to the illustrative embodiments described above and shown in the drawings, but can be freely varied within the scope of the following patent claims. For example, the invention can be utilized in various types of vehicle, for example trucks, buses, working machines such as wheel-mounted loaders and is not limited to terrestrial vehicles. Rather, it can also be utilized in waterborne vehicles such as boats.

An advantageous field of application is in professional traffic which leads to work clothing being possibly exposed to substances and chemicals which are harmful or foul-smelling, for example in the transportation of waste or the handling of refuse.

Further, the shut-off valve can be a so-called solenoid valve, or can alternatively be constituted by some other form of valve which allows the heating element to be temporarily shut off from the coolant circuit.

In an alternative embodiment of the invention, the closet can be provided with a control panel for switching the heating function of the closet on and off. This control can be mechanically connected to the shut-off valve of the closet.

What is claimed is:

1. A system for ventilating a vehicle cab (1) including a closet adaptable to dry clothes, said system comprising: a device constituted by a fan (9) that is placed in the closet (3) in which an air intake (5) and an air extractor (8) are disposed, said fan (9) being placed adjacent to the air extractor (8) to expel air outside the cab (1) via the air extractor (8) after the air, being extracted from the cab (1), passes through the closet (3) for drying clothes placed therein;

wherein said system further comprises a heating device for heating the interior of said closet, said heating device comprising a heating element (12) located adjacent to the air intake of said closet (3); and wherein said system further comprises a valve (20) connecting said heating element (12) to a coolant circuit (19) of an internal combustion engine, a heat source of the heating element (12) being heated coolant.

2. The ventilation system as recited in claim 1, wherein said air extractor (8) is disposed in the upper part of the closet (3).

3. The ventilation system as recited in claim 2, wherein said air extractor (8) is provided with a non-return valve.

4. The ventilation system as recited in claim 1, wherein said air intake (5) is disposed in the lower part of the closet (3).

5. The ventilation system as recited in claim 1, wherein said system further comprises a parking heater (22) coupled to the coolant circuit (19) in parallel with a drive engine (18) of the vehicle.

6. The ventilation system as recited in claim 5, wherein said internal combustion engine constitutes the drive engine of the vehicle.

7. The ventilation system as recited in claim 1, including a battery to power said fan (9), said fan (9) having a low energy consumption allowing overnight use of the system without draining the battery.

8. The ventilation system as recited in claim 1, wherein said valve (20) facilitates closure of the connection between the heating element (12) and the coolant circuit (19).

9. The ventilation system as recited in claim 8, wherein said valve (20) is a solenoid valve.

10. The ventilation system as recited in claim 1, wherein said closet (3) further comprises a container (14) for allowing water to be collected and drained off, said container (14) being disposed in the bottom of the closet (3).

11. A storage, drying and airing system for ventilating a vehicle cab (1) and drying clothes, said system comprising:
1) a closet (3) having:
 (a) a fan (9) operable to cause an air flow from the vehicle cab (1) via an air intake (5) through said closet (3);
 (b) heating device (12) for heating an interior of said closet (3); and
 (c) an arrangement (13) for drying clothes in said air flow after said air intake (5) with its associated heating device (12), wherein said fan (9) is operable to cause air to be drawn via said air intake (5) into said closet (3) and through said closet (3) to a region outside said cab (1); and
2) a valve connecting said heating device (12) to a coolant circuit of an internal combustion engine (18) of said vehicle, said internal combustion engine being operable via the coolant circuit to heat said closet (3).

12. A system as recited in claim 11, wherein said valve is a solenoid valve (20).

13. A system as recited in claim 12, wherein said system further comprises a parking heater (22) coupled to the coolant circuit, said system being operable to couple said parking heater (22) to said internal combustion engine (18) when said internal combustion engine (18) is in an shut-off state.

14. A system as recited in claim 11, wherein said fan (9) is provided with a non-return valve for preventing cold air from being sucked into said closet (3) from outside said vehicle when said fan (9) is in a shut-off state.

15. A system as recited in claim 11, wherein said system includes a container (14) for collecting water from said closet (3) and for draining off said water, said container (14) being disposed at a bottom region of said closet (3).

16. A system as recited in claim 11, wherein said drying arrangement (13) includes a drying grate for allowing drying of shoes within said closet (3).

* * * * *